Oct. 7, 1969      B. MARTINS      3,470,786
TURNABLE DEVICES

Filed June 27, 1966      5 Sheets-Sheet 1

INVENTOR:
Börge Martins,
By Ernest A. Marmorek,
His Attorney.

Oct. 7, 1969  B. MARTINS  3,470,786
TURNABLE DEVICES

Filed June 27, 1966  5 Sheets-Sheet 2

INVENTOR:
Börge Martins,

By *[signature]*,
His Attorney.

Oct. 7, 1969     B. MARTINS     3,470,786

TURNABLE DEVICES

Filed June 27, 1966     5 Sheets-Sheet 3

United States Patent Office 3,470,786
Patented Oct. 7, 1969

3,470,786
TURNABLE DEVICES
Börge Martins, 65 Norre Farimagsgade,
Copenhagen, Denmark
Filed June 27, 1966, Ser. No. 560,476
Claims priority, application Denmark, July 1, 1965,
3,366/65; Apr. 15, 1966, 1,944/66
Int. Cl. F16b *35/00;* B25b *15/00*
U.S. Cl. 85—45                                       8 Claims

ABSTRACT OF THE DISCLOSURE

A turnable device, such as a screw, has an operating portion to be engaged by an actuator such as a screw driver. The operating portion has two wall faces that are arranged diametrically oppositely and face in opposite directions; these faces are symmetrical about an axis of symmetry that extends in the same directions as the axis of rotation. These wall faces are defined by one geometrical surface that is defined by an even curve serving as generatrix and is symmetrical about a point following said axis of symmetry as one directrix, and another directrix is a helix coaxial with said axis of symmetry.

---

This invention relates to a turnable device, such as a fastening device, for example a screw, a bolt, a nut or the like, a spindle or the like, or an operating device, for example a screw driver, a spanner, a wrench, a handle or the like adapted to cooperate with another turnable device for turning or being turned by the latter and being provided with engaging walls adapted to engage like engaging walls on said other turnable device.

Most ordinary screws and also many bolts, nuts and other fastening devices are at the one end provided with one or more slots having parallelly extending side walls. Owing hereto the contact faces of the tool to be used for turning the fastening device, which tool to facilitate the mounting thereof on the fastening device must engage the slot or slots with some clearance, will in each slot contact the engaging or side walls of the slot only along a longitudinal line near the circumference of the said end of the fastening device. Consequently, when the tool is turned for tightening or slackening the fastening device, frequently so great locally limited surface pressures on the engaging walls arise that up to the circumference of the fastening device the slot is disadvantageously widened and in case of repeated tightening and slackening of the fastening device the same will be destroyed. Especially this will be the case in connection with small headless screws or bolts by which the influences from the tool on the side walls of the slot will cause the parts of the body of the fastening device between or outside the slot or slots to be heavily deformed and often completely destroyed.

Other well known screws and bolts are provided at one end thereof with a blind polygon bore, and when tightening or slackening the same a corresponding polygon shaped handle or wrench must be used. Also in this case some clearance between the bore and the tool is necessary so that only the outermost portions of the side faces of the tool are operating during the tightening or slackening of the fastening device resulting in too high surface pressures so that even if the fastening device is made from a very hard material too often it is not able to withstand the tightening strain of the wrench.

Most bolts, nuts and adjusting spindles are provided with a polygon head to be gripped by a spanner, a wrench or a handle. Also in this case it is only the outermost parts of the side walls of the head which are influenced by the operating device resulting in an "eating off" of the edges of either the head or the spanner or the like device.

Further, common to all hitherto known devices of the kind concerned it is that two turnable devices adapted to engage each other ought to have their engaging walls dimensioned exactly corresponding to each other.

The instant invention avoids the aforesaid drawbacks of the prior art. It provides for a simple, and reliable, turnable device that dispenses with the need for inherently strong material. According to the invention this is generally obtained by the device comprising two engaging members each provided with at least one engaging wall which two engaging walls face in opposite directions and are defined by a single even geometric surface which is symmetrical relative to an axis of symmetry parallel to the axis of rotation of the device, said geometric surface being provided by means of a generatrix being an even curve, including a rectilinear line, always situated in a plane perpendicular to the axis of symmetry and being symmetrical about a point following said axis of symmetry as the one directrix, the other directrix being a "helix" coaxial with the axis of symmetry, said term "helix" including a rectilinear line parallel to said axis of symmetry.

A particular object of the present invention is to provide a turnable device of the kind concerned having such engaging walls that when the device is turned by means of a corresponding second device it is ensured that the engaging walls of the first device and the engaging walls of the second device engage each other over the greatest possible area so that even high resistance against the turning of the device only provides tolerable surface pressures, even in case of relative great clearance between the two devices.

Another object of the invention is to provide a turnable device of the kind concerned, which even if made from a relatively soft material, such as plastics, for example from a polyamide, is able to stand even relatively strong pressures from the tool or other turnable device to be used for turning it without being permanently deformed or otherwise destroyed.

A further object of this invention is to provide turnable devices of the kind concerned having such designed engaging walls, that the same tool or other device may be used for turning such devices within a very great range of sizes.

A still further object of the present invention is to provide a turnable device of the kind concerned being designed in such a manner that of two alike devices, although not necessarily being of the same size, the one may be used as a tool for operating the other and vice versa, which may be an advantage at many circumstances.

Still a further object of the present invention is to provide a turnable device of the kind concerned, especially a screw, bolt, nut or another fastening device, provided with at least two pairs of engaging walls, which pairs are oppositely directed, and of which the one pair is adapted to be used when the device is to be turned in one direction and the other pair is adapted to be used by the turning of the device in the opposite direction.

Another object of the present invention is to provide a turnable device of the kind concerned provided with an operating portion comprising axially extending body parts defining between them recesses having side walls formed by said body parts and constituting the engaging walls, which side walls each forms an angle of about 90° with the outer side of the corresponding body part to obtain a great strength thereof.

Other aspects, objects and the several advantages of this invention will be apparent from a study of this disclosure, the accompanying drawings and the appended claims.

Figure 3:
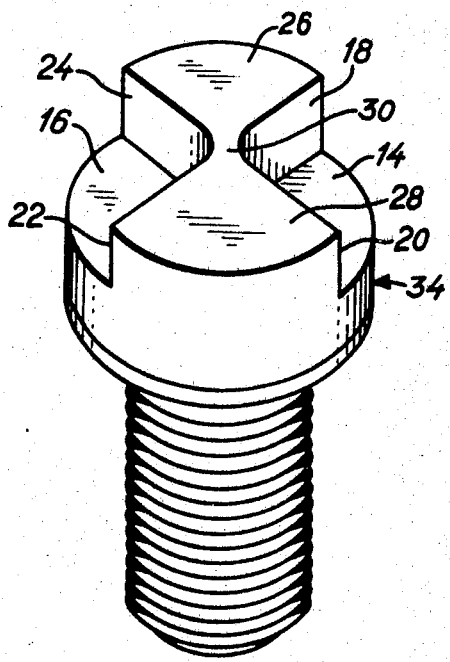
Figure 4:
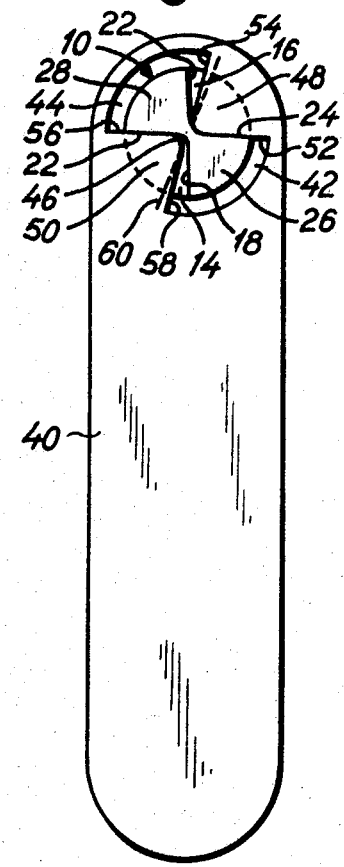
Figure 5:
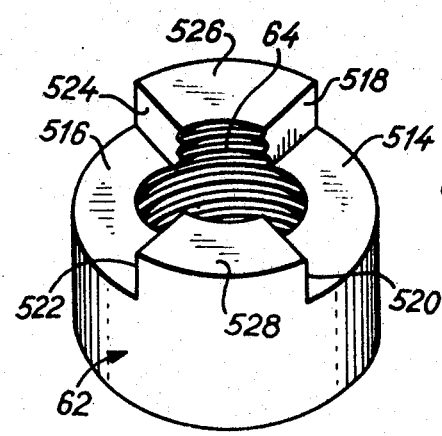
Figure 6:
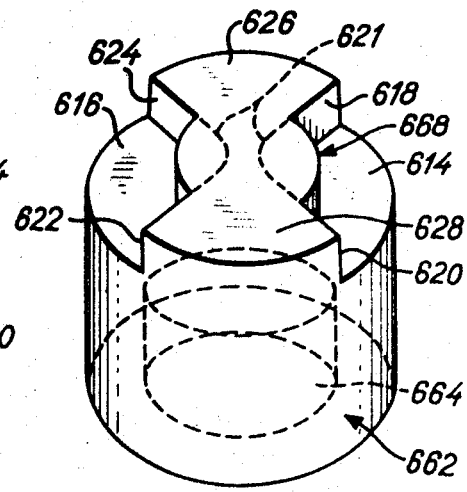
Figure 7:
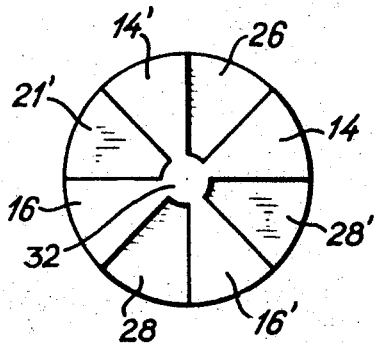
Figure 8:
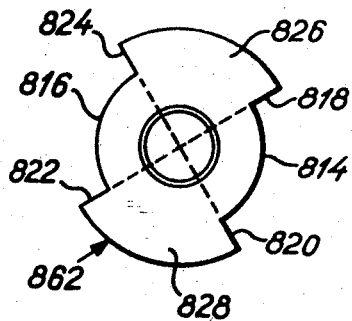
Figure 9:
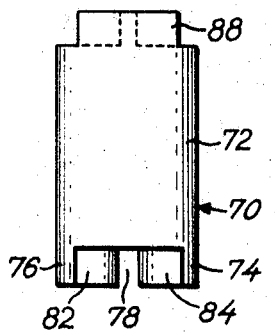
Figure 11:
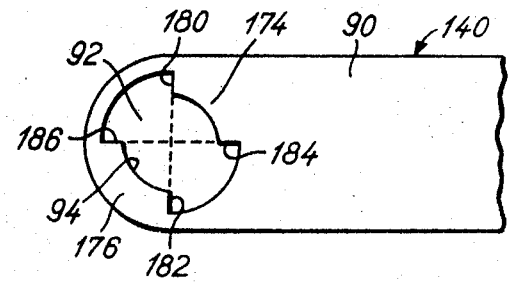
Figure 10:
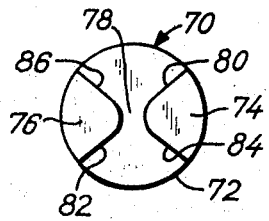
Figure 12:
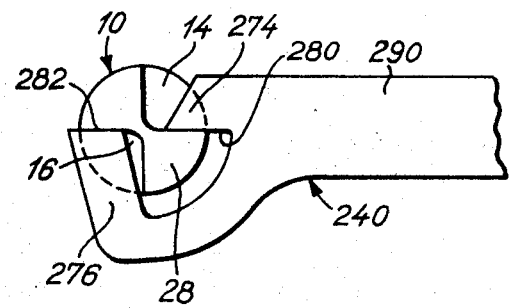
Figure 13:
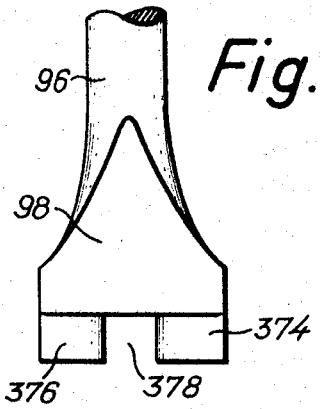
Figure 15:
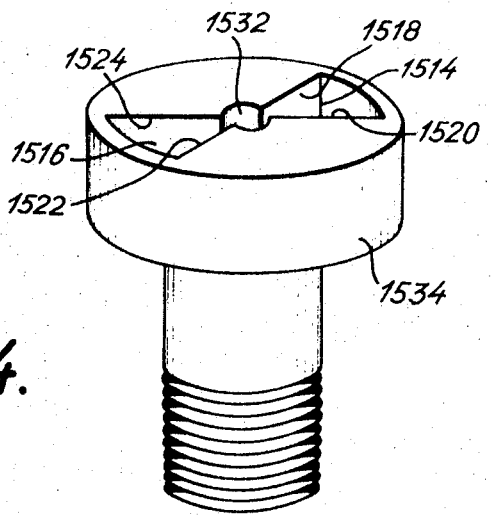
Figure 14:
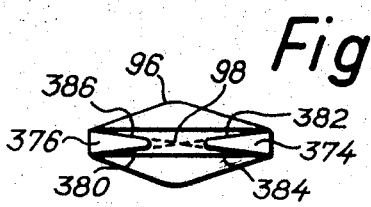
Figure 16:
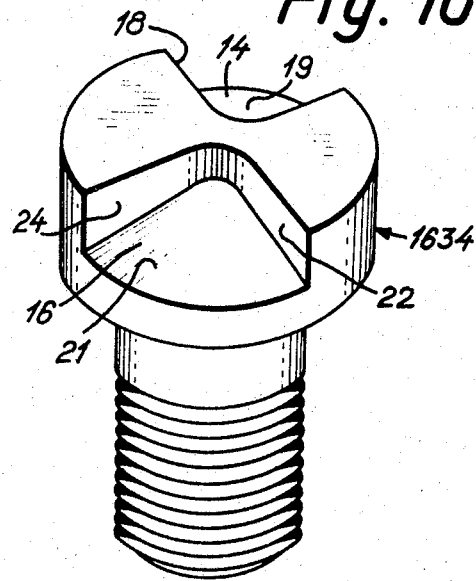
Figure 17:
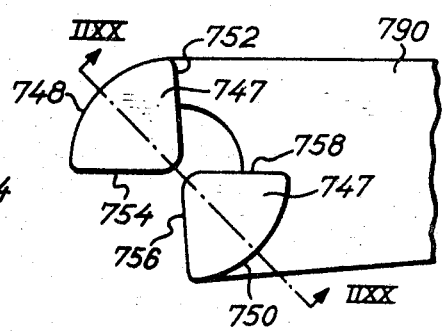
Figure 18:
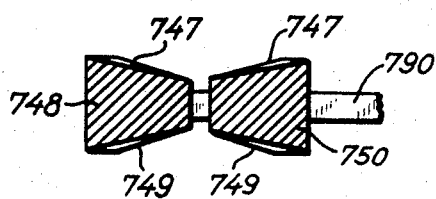
Figure 19:
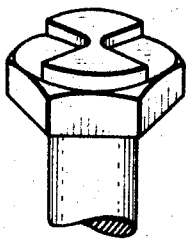
Figure 20:
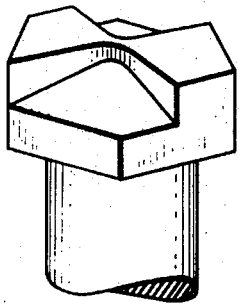
Figure 21:
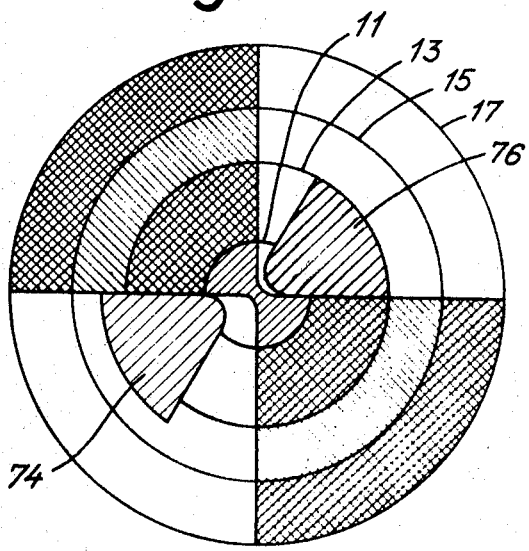
Figure 24:
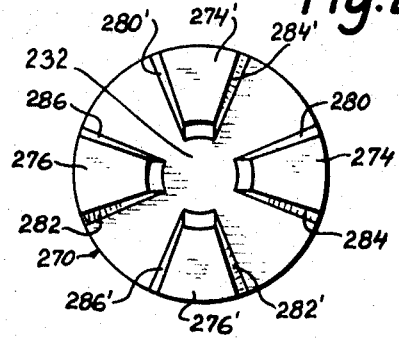
Figure 25:
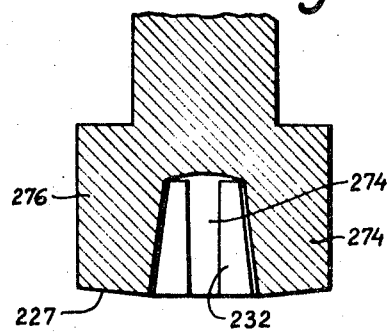
Figure 22:
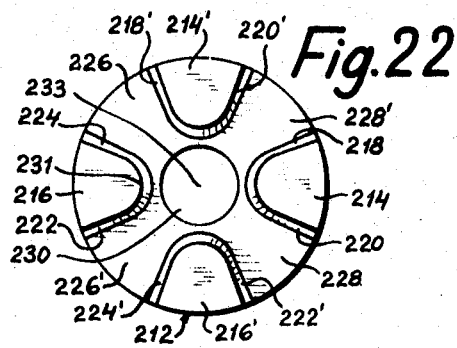
Figure 23:
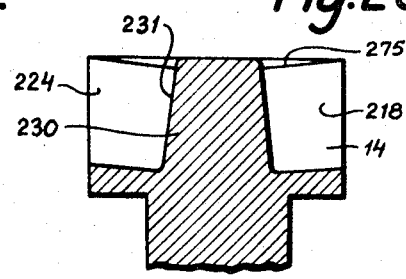
Figure 26:
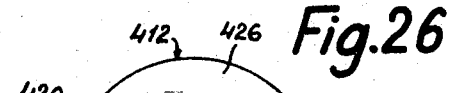
Figure 28:
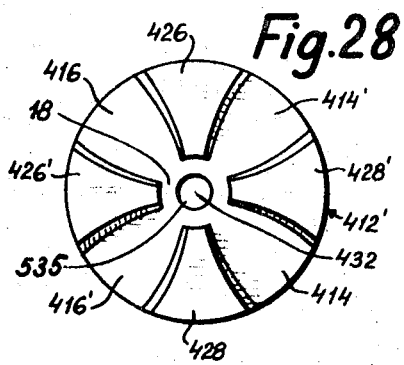

FIG. 3 is a perspective view of a bolt forming a third embodiment of the invention, FIG. 4 is a plan view of a spanner embodying the invention, FIGS. 5 and 6 are perspective views of two different nuts embodying the invention, FIGS. 7 and 8 are top views of two further embodiments of the invention, FIGS. 9 and 10 are an elevational view and a bottom view respectively of a box spanner embodying the invention, FIG. 11 is a fragmentary plan view of a further spanner embodying the invention, FIG. 12 is a fragmentary plan view of another spanner embodying the invention engaging a screw like the one indicated in FIG. 6, FIGS. 13 and 14 are a fragmentary elevational view and a bottom view respectively of a screw driver embodying the invention, FIGS. 15 and 16 are perspective views of two further screw heads embodying the invention, FIG. 17 is a fragmentary plan view of still a further spanner embodying the invention, FIG. 18 is a sectional view after the line IIXX—IIXX in FIG. 17, FIGS. 19 and 20 are perspective views of two other screw heads embodying the invention, FIG. 21 shows diagrammatically a cross section of a spanner according to the invention and illustrates how said spanner may be used for fastening devices of different sizes, FIGS. 22 and 23 are a top view and a longitudinal sectional view respectively of a bolt head forming still another embodiment of the invention, FIGS. 24 and 25 are a longitudinal sectional view and a bottom view respectively of a screw driver embodying the invention and adapted to be used in connection with the bolt shown in FIGS. 22 and 23, FIGS. 26 and 27 are top views of two further bolt heads embodying the invention, and FIG. 28 is a bottom view of a screw driver embodying the invention and adapted to be used in connection with the bolt shown in FIG. 26.

Figure 1:
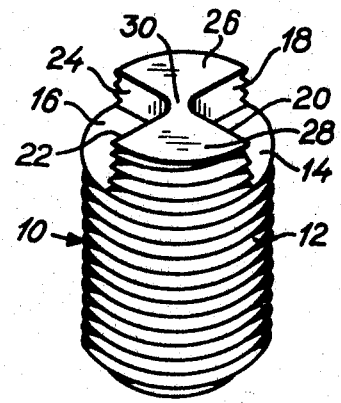
FIG. 1 is a perspective view of a screw forming an embodiment of the invention.

FIG. 1 shows a set screw 10 consisting of the usual body 12 threaded throughout the major portion of its length and provided at its top with two identical, diametrically arranged, axially extending recesses 14 and 16 open at the top end and outwardly. Each recess 14 and 16 is at its sides limited by plane side walls 18, 20 and 22, 24 forming the side walls of two axially extending engaging members 26 and 28 separating the two recesses 14 and 16.

The side wall 18 the recess 14 and the corresponding side wall 22 of the recess 16 are defined by the same axial plane through the axis of the screw 10. In the same manner the two other side walls 20 and 24 are defined by the same axial plane through the axis of the screw, which last said plane thus intersects the first said plane.

In the embodiment shown in FIG. 1 the body parts 26 and 28 are interconnected by a narrow centrally positioned center portion 30 to form a unit. Further in this embodiment each two on each other following of the side walls 18, 20, 22 and 24 form between them an angle of about 90° so that the body parts 26 and 28 as well as the recesses 14 and 16 are of the same magnitude.

Figure 2:
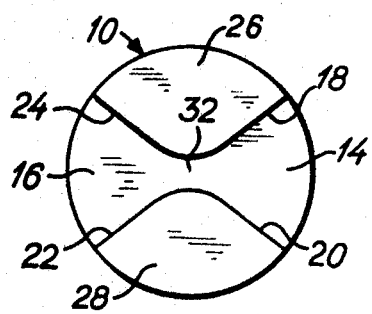
FIG. 2 is a top view of another screw embodying the invention.

As shown in FIG. 2, however, each engaging member 26 and 28 may occupy a greater angle than 90° and further they may form separate bodies, since in this embodiment the two recesses 14 and 16 are interconnected by a center opening 32.

FIG. 3 shows a bolt comprising a head 34 provided with the two recesses 14 and 16 and the two intermediate engaging members 26 and 28 interconnected by the center portion 30 in the same manner as the screw shown in FIG. 1.

FIG. 4 shows a flat spanner 40 having a certain thickness and provided at the one end with two sector like openings 42 and 44 interconnected by a center opening 46 and separated by two engaging sectors 48 and 50. Each side face 52 and 54 of the one engagement sectors is defined by the same plane as the corresponding one of the side faces 56 and 58 of the other engaging sector 50.

The spanner 40 is shown engaging the top of a set screw 10 as the one shown in FIG. 1. Since the angle between the side faces 52 and 54 and also the angle between the side faces 56 and 58 is slightly less than 90° the engaging sectors 48 and 50 are easily brought into engagement with the recesses 16 and 14 of the screw. It is easily seen, however, that in spite of the relatively great clearance between the engaging sectors 48 and 50 of the spanner and the body parts 26 and 28 of the screw, owing thereto that not only the two side faces 52 and 56 of the engaging members 48 and 50 are located in the same plane, but also the side walls 24 and 22 of the body parts 26 and 28 contacted by said side faces are located in the same plane, unavoidably the side face 52 will contact the side wall 24 uniformly over the whole area common to said face and said wall, and that the same will be the case with the side face 56 contacting the side wall 22. Consequently a very high tightening strain of the spanner may be applied without the side faces 52 and 56 of the spanner nor the side walls 22 and 24 of the body parts 26 and 28 of the screw 10 being overloaded.

From FIG. 4 it also appears, that in case two corresponding side faces, for example the side faces 54 and 58, of the engaging sectors 48 and 50 of the spanner 40 should be destroyed, the spanner may be repaired in a simple manner, since it is possible for example by grinding to provide new engaging side faces defined by the same plane for example as indicated by the dotted line 60.

FIG. 5 shows a nut 62 having a through thread 64 and in its upper end two recesses 514 and 516 separated by two axially extending engaging members 526 and 528. The corresponding side walls 518 and 522 of the engaging members 526 and 528 are both defined by the same plane through the axis of the nut 62, and also both the two other side walls 520 and 524 are defined by a single plane intersecting the first said plane. Thus, apart from the recesses 514 and 516 and the engaging members 526 and 528 being inwardly limited by the threaded bore 64, they correspond to the recesses 14 and 16 and the engaging members 26 and 28 of the screw and bolts shown in FIGS. 1 to 4.

This is also the case by the closed nut or sealing end 662 shown in FIG. 6. This nut is provided with a threaded hole 664 closed at the top by a top portion 668 provided with two recesses 614 and 616 laterally separated by engaging members 626 and 628 having side walls 618, 620, 622 and 624, two and two defined by the same of two intersecting planes.

In the embodiment shown in FIG. 6 the recesses 614 and 616 have cross sections corresponding to annular sectors, but, naturally, as indicated by dotted lines 621 they may also be formed in the same manner as the recesses 14 and 16 shown for example in FIGS. 1 and 3.

FIG. 7 shows a screw- or bolt-head provided with two pairs of recesses 14, 16 and 14' and 16', which recesses laterally are separated by means of engaging members 26, 26', 28 and 28'. The head further is provided with a center opening 32 interconnecting the said recesses. The side walls of each pair of recesses 14, 16 and 14', 16' are arranged as described above with reference to FIGS. 1 to 3.

FIG. 8 shows a nut 862 having laterally protruding sector like wings 826 and 828 and between them recesses 814 and 816, the side walls 818, 820, 822 and 824 of which are arranged as above described with reference to FIGS. 1 to 6.

For operating the above described fastening members and the like devices provided with recesses having side walls arranged as described above many different kinds of operating tools, handles or the like may be used, provided a such tool comprises at least two separated engaging members providing two in opposite directions facing engaging faces or walls defined by the same plane.

Besides the spanner shown in FIG. 4 some other casual examples of such tools are shown in FIGS. 9 to 14.

FIGS. 9 and 10 show a box spanner 70 consisting of a cylindrical body 72 at the lower end provided with two axially protruding sector like engaging members 74 and 76 separated by a center opening 78. The engaging members 74 and 76 are provided with side walls defining two pairs 80, 82 and 84, 86 of engaging faces, the engaging faces 80 and 82, resp. 84 and 86 of each pair facing in opposite directions and being defined by the same plane, in the embodiment shown by two intersecting planes through the axis of the cylindrical body 72.

At its upper end the body 72 is provided with an operating portion 88 formed in the same manner as for example the screw end shown in FIG. 2.

The box spanner shown in FIGS. 9 and 10 may be used for all the fastening device embodiments shown in FIGS. 1 to 3, 5 and 6.

A like spanner, in which the angle between the side faces of engaging member 74 and 76, which angle in the embodiment shown in FIGS. 9 and 10 is slightly less than 90°, is made slightly less than 45° may be used for the fastening device shown in FIG. 7.

FIG. 11 shows a spanner 140 adapted to be used for example in connection with the fastening device embodiments shown in FIGS. 5, 6 and 8. It consists of a shaft 90 having some thickness and provided at one end with a through opening 92 defining two inwardly extending engaging members 174 and 176 having their inner faces 94 following a cylinder and having side faces 180 and 186 and 182 and 184 respectively providing two pairs 180, 182 and 184, 186 of engaging faces, the engaging faces of each pair facing in opposite directions and being defined by the same plane.

FIG. 12 shows a spanner like tool 240 comprising a shaft 290 provided at one end with a fork 274, 276, the one leg 274 of which has a longitudinal inwardly facing engaging face 280, whereas the other leg 276 at its end is provided with an outwardly facing engaging face 282 defined by the same plane as the face 280. The tool is shown engaging a screw 10 of the kind shown in FIG. 1.

FIGS. 13 and 14 show a screw driver having a shaft 96 with a flat lower part 98. This lower part is provided with two downwardly extending engaging members 374 and 376 separated by an opening 378 and provided with side faces forming two pairs 380, 382 and 384, 386 of engaging faces, the two faces of each pair facing in opposite directions and being defined by the same plane. This screw driver may be used in connection with for example the fastening device embodiments shown in FIGS. 1 to 3 and 7 and in some cases, depending on the width of the opening 378 also with the embodiments shown in FIGS. 5, 6 and 8.

FIG. 15 shows a screw having a screw head 1534 the upper end of which is provided with an impression defining two recesses 1514 and 1516 interconnected by a center opening 1532 and having side face 1518, 1520, 1522 and 1524 all in the same manner as described above in connection with FIG. 2 apart therefrom that in the embodiment shown in FIG. 15 the recesses 1514 and 1516 are closed also to the outside of the head 1534.

FIG. 16 shows a bolt provided with a head 1634 corresponding to the head 34 shown in FIG. 3, but differing therefrom thereby that the bottoms 19 and 21 of the recesses 14 and 16 are sloping outwards which makes it easier to form the head 1634 by pressing from above by means of a suitable pressing tool.

FIGS. 17 and 18 show a spanner comprising a shaft 790 provided at the one end with two engaging sectors 748 and 750 extending to both sides of the shaft 790 but apart therefrom corresponding to the engaging sectors 48 and 50 of the spanner shown in FIG. 4. Thus the engaging sectors 748 and 750 are provided with engaging walls 752, 754, 756 and 758 arranged in the same manner as above described. The upper and lower end faces 747 and 749 of each sector 748 and 750 are, however, sloping conically inwards making it easier to obtain engagement between the spanner and a screw head or a nut to be operated by the spanner.

FIGS. 19 and 20 show two bolts illustrating two different examples of how the design according to the present invention may be combined with polygonal device ends as hitherto normally used.

FIG. 21 shows in a greater scale a cross section through the engaging members 74 and 76 of the tool 70 shown in FIGS. 9 and 10 or a like tool, and illustrates how this tool even when eccentrically arranged may be used in connection with devices according to the invention withing a great range of sizes illustrated by circular lines 11, 13, 15 and 17.

In all the embodiments described above each pair of engaging walls are described as defined by a plane and even by a plane through the axis of the device. The reason is that the principle of the present invention is easier to be explained and understood in connection with such axial planes. In general, however, many other forms of surfaces may be used for defining each pair of engaging walls, provided each such surface is symmetrical relative to an axis of symmetry parallel to the axis of rotation of the device. Most appropriate said axis of symmetry is identical wtih the axis of rotation of the device since thereby a symmetrical head of the device is obtained, but this is not absolutely necessary.

Some embodiments of the invention in which the engaging walls are defined by other surfaces than planes are shown in FIGS. 22 to 26.

FIGS. 22 and 23 show a bolt head 212 in many respects corresponding to the one shown in FIG. 7, but in which each pair of engaging walls 218, 222; 220, 224; 218', 222' and 220' and 224' is defined by a skew surface having generatrices perpendicular to the axis 233 of the bolt constituting a rectilinear diatrix of the skew surface which has a further rectilinear diatrix in a plane parallel to the said axis. In mass production very often such skew surfaces are easier to manufacture by pressing than corresponding surfaces defined by axial planes.

In the embodiment shown in FIGS. 22 and 23, contrary to the embodiment shown in FIG. 7, the body parts 226, 226'; 228 and 228' are united by means of a center portion 230 having tapering side walls 231 at the recesses 214, 214', 216 and 216'. The top of the center portion 230 extends as appears from FIG. 23, somewhat above the dished upper surface 225 of the body parts 226, 226', 228 and 228'.

For turning the bolt 212 shown in FIGS. 22 and 23 a tool 270, for example a screw driver, as the one shown in FIGS. 24 and 25 may be used.

This screw driver is formed in the same way as the bolt head 212 with recesses arranged between body parts or engaging members 274, 276, 274' and 276' and pairs of coordinated engaging walls or faces 280, 282, 284, 286, 280', 282' and 284', 286' defined by skew surfaces, but differs therefrom thereby that the recesses are interconnected by a tapered center opening 232 having a tapering corresponding to the tapering of the center portion 230 and being able to receive the latter. Further the lower surface 227 of the engaging members 274, 276, 274' and 276' is convex corresponding to the dished upper surface 225 of the bolt 234. Consequently, when tthe tool 270 is placed on the bolt 212 it will automatically be centered relative to the bolt and when turned automatically engage the same. Owing to the skew surfaces defining the engaging walls being alike and owing to the symmetry of said walls the whole area of a pair of engaging walls of the tool engaging a pair of engaging walls of the bolt will contact each other over the whole area common to them. Even if the axis of the bolt and the axis of the tool should not be exactly identical owing to the clearance necessary in practice, the deviation between two engaging walls engaging each other will be so small that as soon some force has to be used for the turning, said deviation will be neutralized owing to the elastic deformation of the walls long before local over load of the walls may arise.

The bolt head 412 shown in FIG. 26 is provided with two engaging members 426 and 428 and two recesses 414 and 416 interconnected by a center opening 435. Thus this bolt head is provided with two pairs of engaging walls 418, 422 and 420, 424. The two walls of each pair are symmetry relative to an axis of symmetry being identical with the axis 433 of the bolt and the surface defining them is provided by a S-formed generatrix situated in a plane perpendicular to the axis 433 and being symmetrical about a point following the axis 433 as directrix. In the embodiment shown said generatrix is formed by two alike circular arcs facing in opposite direction, but any curved generatrix may be used, provided it is symmetrical about a point following the axis of symmetry as diatrix.

Figure 27:
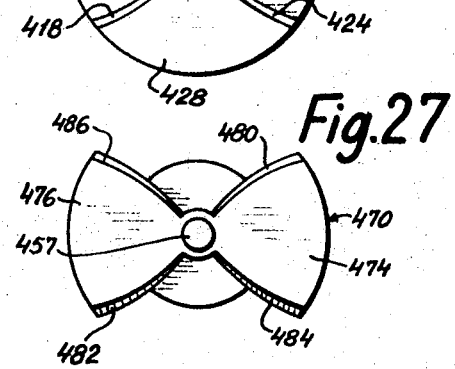

For operation of the bolt 412 a tool 470, for example screw driver, as the one shown in FIG. 27 may be used. This tool is provided with engaging members 474 and 476, the two pairs of engaging walls, 480, 482 and 484, 486 respectively, of which are defined by surfaces exactly corresponding to the surface defining the pairs of cooperating engaging walls 418, 422 and 420, 424 of the bolt 412.

These surfaces have such a form that not alone they ensure the even distribution of the pressure between cooperating engaging walls but also counteract an axial displacement of the engaging walls relative to each other so that the risk of the tool being pressed axially away from the bolt 412 is eliminated.

In the embodiments shown in FIGS. 26 and 27, the side walls of the recesses 414 and 416 of the bolt are concavely curved, whereas the side walls of the engaging members 474 and 476 of the tool are convexely curved, but since it is a question of cooperation between the walls of the bolt and the walls of the tool, this condition may be changed.

Finally FIG. 28 shows an embodiment 412' corresponding to FIG. 26 but being provided with two sets or pairs of coordinated recesses 414, 416 and 414' and 416' respectively.

Also the embodiments shown in FIGS. 26 to 28 are provided with centering means since the bottom of the center openings of the bolts 412 and 412' are provided each with a guide recess 435 and 432 and the tool shown in FIG. 27 with a corresponding guide projection 457.

It has to be observed that in the embodiments shown in FIGS. 22 to 28 the second diatrix for the generatrix besides the axis of symmetry does not necessarily be rectilinear. Assuming that the depth of engagement between two cooperating turnable devices shall be of no importance, it may be convenient that the directrix has tangents which all have the same inclination relative to the axis of symmetry, that is that said directrix ought to be a helix.

The fastening device as well as the tool may be made from any solid material. An especial advantage obtained by the invention is that it makes it possible in connection with fastening devices made of a plastics to use much higher tightening forces than hitherto possible.

Besides for screws, bolts, nuts and the like fastening devices the invention may be used for a great number of other devices which have to be turned by means of a tool, a handle, a clutch device or the like, for example for valve rods, adjusting screws and other adjusting- or setting-rods or spindles, clutch members, different tools, such as box spanners as described above in connection with FIGS. 9 and 10, and a lot of other turnable devices to be turned by means of another turnable device.

It will be understood that this invention is susceptible to modification in order to adapt it to different usages and conditions; and, accordingly, it is desired to comprehend such modifications within the invention.

I claim:

1. A turnable device having an axis of rotation and adapted to cooperate with another turnable device for turning or being turned by the latter; an operating portion at one end thereof; said operating portion comprising two engaging members each provided with at least one axially extending engaging wall; said two engaging walls facing in opposite directions and being defined by a single even geometrical surface symmetrical relative to an axis of symmetry parallel to said axis of rotation, said geometric surface being provided by means of a generatrix being an even curve, including a rectilinear line, always situated in a plane perpendicular to said axis of symmetry and being symmetrical about a point thereof following sad axis of symmetry as the one directrix, another being a helix coaxial with said axis of symmetry, said term "helix" including a rectilinear line parallel to said axis of symmetry, said operating portion comprising at said end axially extending engaging members and defiining between them two recesses arranged opposite each other and open at said end; each said recess having axially extending side walls formed by said engaging members; said four side walls being defined by two surfaces intersecting each other between said two recesses along said axis of symmetry and each being symmetrical relative to said axis of symmetry; said four side walls thus constituting two pairs of said engaging walls.

2. A turnable device as defined in claim 1, said engaging members defining beteeen them at least two pairs of said opposite arranged recesses.

3. A turnable device as defined in claim 1, said recesses being open besides at the said end also at the outer side of said operating portion; each said recess being provided with an outwardly sloping bottom.

4. A turnable device as defined in claim 3, each said bottom being defined by a conical face.

5. A turnable device as defined in claim 1, each said engaging member having an inwardly sloping end face.

6. A turnable device as defined in claim 5, each said end face being defined by a conical face.

7. A turnable device as defined in claim 1, each said recess extending through the whole length of said operating portion.

8. A turnable device as defined in claim 1, said operating portion comprising a part having a polygonal curcumference, said engaging members extending above said polygonal part.

References Cited

UNITED STATES PATENTS

| | | | |
|---|---|---|---|
| 55,524 | 6/1866 | Morris | 85—45 |
| 1,269,971 | 6/1918 | Smith | 85—45 |
| 1,330,098 | 2/1920 | Smith | 85—45 |
| 2,106,278 | 1/1938 | Redmer | 85—45 |
| 2,142,185 | 1/1939 | Fieg | 85—45 |
| 2,206,085 | 7/1940 | Fieg | 85—45 |
| 2,291,846 | 8/1942 | Taylor | 85—45 |
| 2,556,155 | 6/1951 | Stellin | 85—45 |
| 3,175,593 | 3/1965 | Laonay | 85—45 |
| 3,285,119 | 11/1966 | Dean et al. | 85—45 |

FOREIGN PATENTS

| | | |
|---|---|---|
| 110,624 | 4/1964 | Czechoslovakia. |

RAMON S. BRITTS, Primary Examiner

U.S. Cl. X.R.

145—50